(12) United States Patent
Kuroumaru et al.

(10) Patent No.: US 7,520,366 B2
(45) Date of Patent: Apr. 21, 2009

(54) METHOD FOR PRODUCING ELECTRIC POWER STEERING APPARATUS

(75) Inventors: Yoshikazu Kuroumaru, Kashiwara (JP); Shirou Nakano, Osaka (JP); Katsutoshi Nishizaki, Nabari (JP)

(73) Assignee: JTEKT Corporation, Osaka (JP)

( * ) Notice: Subject to any disclaimer, the term of this patent is extended or adjusted under 35 U.S.C. 154(b) by 282 days.

(21) Appl. No.: 10/589,904

(22) PCT Filed: Feb. 17, 2005

(86) PCT No.: PCT/JP2005/002469

§ 371 (c)(1),
(2), (4) Date: Aug. 17, 2006

(87) PCT Pub. No.: WO2005/080174

PCT Pub. Date: Sep. 1, 2005

(65) Prior Publication Data

US 2007/0272471 A1 Nov. 29, 2007

(30) Foreign Application Priority Data

Feb. 20, 2004 (JP) ............................ 2004-045360

(51) Int. Cl.
*B62D 5/04* (2006.01)
(52) U.S. Cl. ........................................ 180/444; 310/89
(58) Field of Classification Search ................ 180/444; 310/89
See application file for complete search history.

(56) References Cited

U.S. PATENT DOCUMENTS

| 6,173,799 B1 * | 1/2001 | Miyazaki et al. ............ 180/19.3 |
| 7,235,905 B2 * | 6/2007 | Matsubara et al. ............ 310/89 |
| 2006/0191356 A1 * | 8/2006 | Chikaraishi ............ 73/862.331 |
| 2007/0272471 A1 * | 11/2007 | Kuroumaru et al. ......... 180/444 |

FOREIGN PATENT DOCUMENTS

| JP | 52-10278 U | 1/1977 |
| JP | 58-142068 A | 8/1983 |
| JP | 62-144773 U | 9/1987 |
| JP | 11-124045 A | 5/1999 |
| JP | 2003-48551 A | 2/2003 |

* cited by examiner

*Primary Examiner*—Paul N Dickson
*Assistant Examiner*—Tashiana Adams
(74) *Attorney, Agent, or Firm*—Birch, Stewart, Kolasch & Birch, LLP

(57) ABSTRACT

A second housing is aligned with a first housing at a predetermined position using positioning means that determines the mounting position of the housing with respect to the first housing at the predetermined position; steering shaft supporting sections and output shaft supporting sections are provided in the first housing and the second housing respectively while the housings being mounted using screws or the like; the second housing is removed temporarily from the first housing; a steering shaft and an output shaft are supported using the steering shaft supporting sections and the output shaft supporting sections; and the second housing is aligned again with the first housing at the predetermined position using the positioning means and mounted.

8 Claims, 9 Drawing Sheets (a)

(b)

(a)

(b)

(a)

(b)

F I G. 7
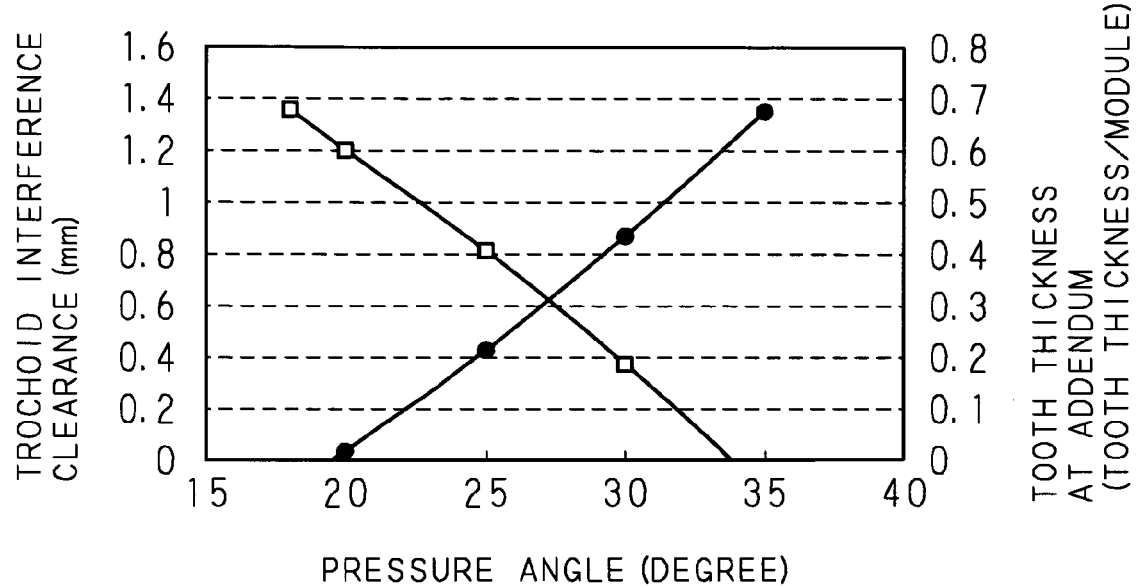

F I G. 8
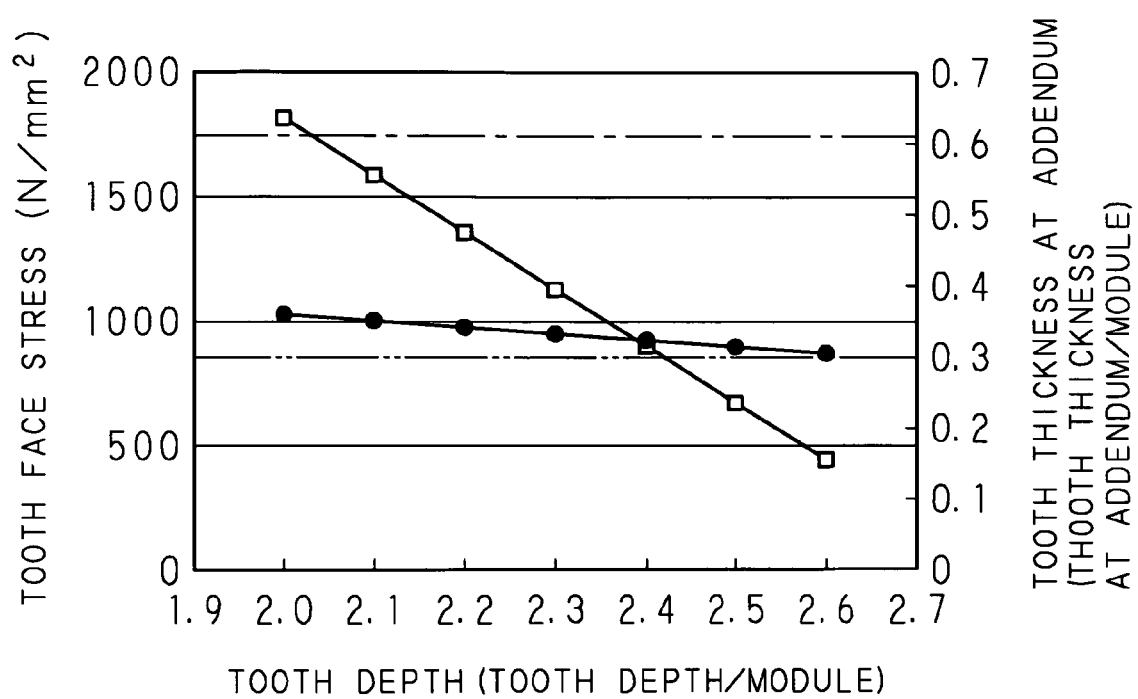

METHOD FOR PRODUCING ELECTRIC POWER STEERING APPARATUS

This application is the national phase under 35 U.S.C. §371 of PCT International Application No. PCT/JP2005/002469 which has an International filing date of Feb. 17, 2005 and designated the United States of America.

TECHNICAL FIELD

The present invention relates to a method for producing an electric power steering apparatus that assists the driver to steer a vehicle by transmitting the drive power of a motor via gears to a steering shaft equipped with a steering wheel on the upper side thereof.

BACKGROUND ART

In an electric power steering apparatus, the drive power of a motor is transmitted at reduced speed via a small gear provided on the output shaft of the motor and a large gear meshed with the small gear to a steering shaft provided with the large gear, and the rotating motion of the steering shaft is assisted. As the small gear and the large gear, spur gears, helical gears or the like, having power transmission efficiency higher than that of a worm gear, are used to make the electric power steering apparatus compact (Japanese Utility Model Application Laid-open No. 62-144773 (1987)). By the use of such gears having high power transmission efficiency, the output of the motor, required for assisting steering operation, can be reduced, and the motor can be made compact. In the case that spur gears or the like are used, the steering shaft is nearly parallel with the output shaft.

In recent years, for the purpose of making the electric power steering apparatus more compact, an electric power steering apparatus comprising gears based on a special theory has been proposed, in which one set of gears is used, and the large gear thereof is made as small as possible while the speed reduction ratio required for assisting steering operation is maintained and while the gear strength applicable to practical use can be obtained securely (Japanese Patent Application Laid-open No. 11-124045 (1999)). The gears based on the special theory are gears in which the curvature of the tooth profile curve is a continuous differentiable function and changes periodically in the direction of the tooth depth.

In the electric power steering apparatus comprising the gears based on the special theory, for the purpose of securely obtaining the gear strength applicable to practical use, it is necessary to accurately process the gears and to accurately maintain the center distance between the gears accommodated in the housing.

In addition, for the purpose of smoothly rotating the gears, it is necessary to provide appropriate backlash between the tooth faces. In other words, if the backlash is too large, the problem of backlash noise, that is, large meshing noise due to the collision of the tooth faces, is caused; if the backlash is too small, the problem of unsmooth gear rotation is caused. For the purpose of solving these problems, it is necessary to maintain the center distance between the gears accommodated in the housing constant.

Conventionally, these problems are solved by accommodating the steering shaft and the output shaft in the same housing, by fitting a guide plate provided with two holes spaced by a predetermined distance on the steering shaft and the output shaft, thereby maintaining the steering shaft and the output shaft in nearly parallel with each other.

More specifically, first, the steering shaft is accommodated in the housing via two roller bearings, and the motor and the output shaft are accommodated in the housing so that the steering shaft and the output shaft are in nearly parallel with each other. At this stage, the center distance between the large gear provided on the steering shaft and the small gear provided on the output shaft is not accurately constant. Next, the steering shaft is rotatably fitted into one hole provided in the guide plate, and the output shaft of the motor is rotatably fitted into the other hole. Furthermore, a C-ring is mounted on the output shaft or the steering shaft so that the guide plate is positioned at the end of the output shaft. Even if the guide plate is subjected to a force acting to move it in the axial direction, the C-ring serves as a stopper, whereby the guide plate is not moved along the output shaft or dropped from the end of the output shaft.

In the electric power steering apparatus being produced as described above, the center distance between the large gear and the small gear can be maintained accurately. In other words, the center distance between the gears can be maintained constant in the range of the dimensional errors of the two holes provided in the guide plate; therefore, the gear strength applicable to practical use can be obtained securely, and the problem of backlash noise can be solved.

However, in the conventional configuration, in the case that the electric power steering apparatus is used for a long time, the center distance between the gears cannot be maintained accurately, thereby causing problems of being unable to securely obtain sufficient gear strength and being unable to maintain appropriate backlash between the gears. In other words, in the conventional configuration, the walls of the holes provided in the guide plate are in the state of making tight contact with the output shaft and the steering shaft to accurately maintain the center distance between the gears; in the case that the electric power steering apparatus is used for a long time in this state, the walls of the holes are inevitably worn and deformed owing to the rotation of the steering shaft and the output shaft. Hence, the center distance between the large gear and the small gear cannot be maintained accurately owing to the abrasion of the walls of the holes, and the gear strength assumed in the design stage cannot be maintained. Furthermore, because of the same reason, the backlash between the gears cannot be maintained appropriately.

Moreover, because the gears based on the special theory have special tooth face profile, problems are caused, that is, the gears cannot be processed using existing general-purpose machines, and the process accuracy of the gears cannot be inspected efficiently.

DISCLOSURE OF THE INVENTION

In view of the above-mentioned circumstances, an object of the present invention is to provide a method for producing an electric power steering apparatus capable of maintaining the center distance between the large gear and the small gear constant and securely obtaining sufficient gear strength of the gears and appropriate backlash between the gears, and also capable of maintaining the sufficient gear strength of the gears and the appropriate backlash between the gears even if the electric power steering apparatus is used for a long time.

In addition, another object of the present invention is to provide a method for producing an electric power steering apparatus capable of attaining a predetermined speed reduction ratio and securely obtaining sufficient gear strength using a simple structure even in the case that the apparatus comprises a pair of spur gears or helical gears.

The method for producing the electric power steering apparatus according to the present invention is a method for producing an electric power steering apparatus assisting steering by transmitting the drive power of a motor via a small gear provided on the output shaft of the motor and a large gear meshed with the small gear to a steering shaft provided with the large gear, and comprising first and second housings accommodating the steering shaft and the output shaft, the second housing being mounted on the first housing, characterized in that the second housing is temporarily mounted on the first housing in the state that the mounting position of the second housing with respect to the first housing is aligned at a predetermined position using positioning means that aligns the second housing at the predetermined position; that steering shaft supporting sections that support the steering shaft and output shaft supporting sections that support the output shaft in nearly parallel with the steering shaft are provided for the first housing and the second housing respectively; that the second housing is removed from the first housing; that the steering shaft and the output shaft are supported using the steering shaft supporting sections and the output shaft supporting sections via bearings; and that the second housing is mounted on the first housing by aligning the second housing at the predetermined position using the positioning means.

With the present invention, because the mounting position of the second housing with respect to the first housing can be aligned at the predetermined position using the positioning means, even if the second housing is removed from the first housing so that the steering shaft and the output shaft are accommodated in the respective housings after the second housing was mounted in the first housing in the state of being aligned at the predetermined position and the steering shaft supporting sections and the output shaft supporting sections were provided for the first housing and the second housing respectively, the second housing can be mounted on the first housing by aligning the relative position of the second housing with respect to the first housing at the predetermined position using the positioning means again. Hence, the center distance between the gears is maintained constant in the range of the dimensional errors of the steering shaft supporting sections, the output shaft supporting sections and the respective bearings and in the range of the mounting position accuracy of the positioning means.

Furthermore, because the steering shaft and the output shaft of the motor are supported using the steering shaft supporting sections and the output shaft supporting sections via the bearings, the steering shaft supporting sections or the output shaft supporting sections are not worn by the rotation of the steering shaft and the output shaft, whereby the center distance between the steering shaft and the output shaft can be maintained accurately.

The method for producing the electric power steering apparatus according to the present invention is characterized in that the positioning means comprises two sets of pin holes provided in the first housing and the second housing respectively and two pins to be engaged with the pin holes.

With the present invention, the mounting position of the second housing with respect to the first housing can be aligned at the predetermined position by aligning the second housing with the first housing and by engaging the two pins with the two sets of pin holes provided in the first and second housings. The predetermined position is a position determined by the positions of the two sets of pin holes. The second housing can be aligned with the first housing with higher position accuracy using the positioning means than the case of mounting the second housing on the first housing by merely using screws. In other words, the second housing can be positioned on the first housing in the range of the dimensional errors of the two sets of pin holes and the dimensional errors of the two pins engaged with the pin holes. Because the position alignment of the mounting position of the second housing with respect to the first housing is the position alignment on a two-dimensional plane, the position alignment can be attained sufficiently using the two sets of pin holes and the two pins.

The method for producing the electric power steering apparatus according to the present invention is characterized in that the pin holes are tapered holes, and the pins are tapered pins.

With the present invention, the second housing can be aligned with the first housing with higher position accuracy by engaging the two tapered pins with the two sets of pin holes serving as tapered holes than the case of carrying out positioning using other pins, such as parallel pins.

The method for producing the electric power steering apparatus according to the present invention is characterized in that the center distance between the output shaft and the steering shaft is 35 mm or more and 85 mm or less; in the small gear, the number of teeth is 6 or more and 15 or less, the module is 0.8 or more and 1.5 or less, the tooth depth is 2.4 times the module or less, the pressure angle is 20 degrees or more and 27 degrees or less, and the helix angle is 20 degrees or more and 40 degrees or less; and the tooth profile of one or both of the small gear and the large gear is formed so that the pressure angle increases in the direction from the addendum to the deddendum of the gear, and an involute gear subjected to crowning in the tooth trace direction is used for one or both of the small gear and the large gear.

With the present invention, because of the above-mentioned specifications and dimensions, appropriate values can be obtained securely for the trochoid interference clearance, the tooth thickness at the addendum and the tooth face stress even in the case of using gears that can be produced using ordinary production processes, without using the tooth profile based on the predetermined special theory.

In addition, by the use of the involute gear, the tooth profile of which is formed so that the pressure angle increases in the direction from the addendum to the deddendum of the gear, the stress applied to the deddendum at the maximum torque load can be reduced, and the durability of the gear can be obtained securely.

Furthermore, by the use of the involute gear subjected to crowning in the tooth trace direction, the tooth face stress is reduced. Hence, even if continuous operation is carried out under the rated load conditions, the durability of the gear can be obtained securely.

With the present invention, the gear strength and appropriate backlash assumed in the design of the gear can be obtained securely in the assembly process of the electric power steering apparatus; hence, even if the electric power steering apparatus is used for a long time, the above-mentioned gear strength and appropriate backlash can be maintained.

In addition, with the present invention, the second housing can be mounted easily on the first housing with high mounting position accuracy.

Furthermore, with the present invention, the large gear and the small gear can be made compact, and the gear strength applicable to practical use can be obtained securely for a long time.

Moreover, with the present invention, the second housing can be mounted on the first housing with higher position accuracy than the case of carrying out positioning the second housing on the first housing parallel pins or the like.

Still further, because of the above-mentioned specifications and dimensions, appropriate values can be obtained securely for the trochoid interference clearance, the tooth thickness at the addendum and the tooth face stress without using the tooth profile based on the predetermined special theory.

BRIEF DESCRIPTION OF THE DRAWINGS

FIG. 7 is a graph showing the relationship among the pressure angle, the trochoid interference clearance and the tooth thickness at the addendum of the small gear;

FIG. 8 is a graph showing the relationship of the tooth face stress and the tooth thickness at addendum depending on the tooth depth of the small gear.

Figure 1:
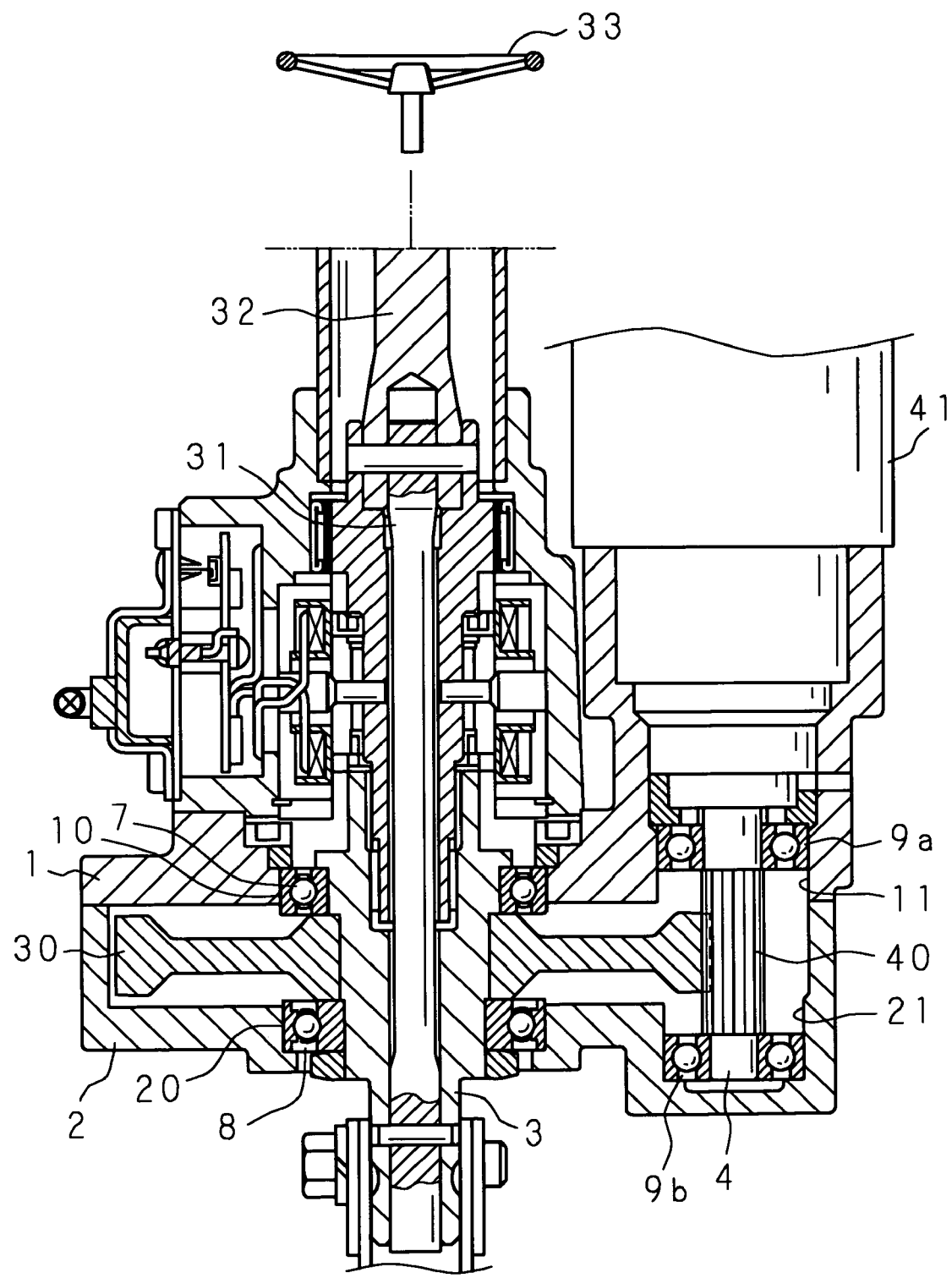
FIG. 1 is a sectional view schematically showing the main sections of an electric power steering apparatus that is produced using a method according to the present invention, as seen from the side of a vehicle.

EXPLANATIONS OF NUMERALS 1 first housing
2 second housing
3 steering shaft
4 output shaft
5a, 5b pins (positioning means)
7, 8, 9a, 9b bearings
10, 20 steering shaft supporting sections
11, 21 output shaft supporting sections
12a, 12b pin holes (positioning means)
22a, 22b pin holes (positioning means)
30 large gear
33 steering wheel
40 small gear
41 motor
h tooth depth
m module
L center distance
Z number of teeth
á pressure angle
â helix angle

BEST MODES FOR CARRYING OUT THE INVENTION

Embodiment 1

The present invention will be described below in detail on the basis of the drawings showing the embodiments thereof.

Figure 2:
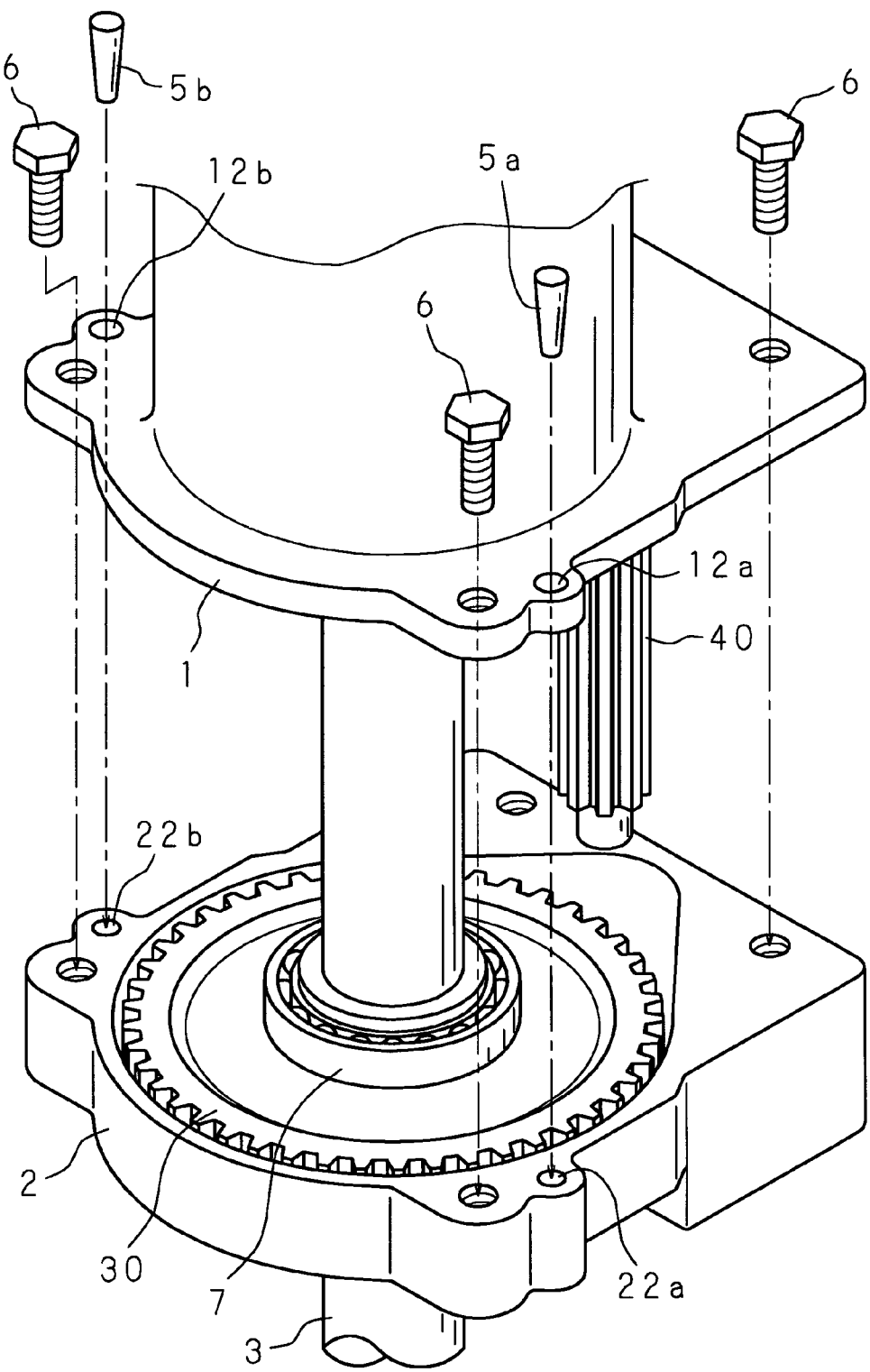
FIG. 2 is an exploded perspective view schematically showing the main sections of the electric power steering apparatus that is produced using the method according to the present invention, as seen from the side of the vehicle.

FIGS. 1 and 2 are a sectional view and an exploded perspective view, respectively, schematically showing the main sections of an electric power steering apparatus that is produced using a method according to the present invention, as seen from the side of a vehicle. In the figures, numeral 3 designates a cylindrical steering shaft, on the outer circumference of which a large gear 30 is pressure-fitted, and the steering shaft 3 is rotatably accommodated in a first housing 1 and a second housing 2 so that the axial direction thereof is vertical. The steering shaft 3 is connected to a column shaft 32 equipped with a steering wheel 33 on the upper side thereof via a torsion bar 31 made of an elastic material and fitted in and secured to the steering shaft 3. In addition, the steering shaft 3 is equipped with a universal joint (not shown) at the lower end thereof, and connected to a rack-and-pinion steering mechanism, for example, via the universal joint. The large gear 30 is a spur gear and is rotatably accommodated in the first housing 1 and the second housing 2 so as to be meshed in parallel with a small gear 40 serving as a spur gear mounted on the output shaft 4 of a motor 41 and so that the output shaft 4 is nearly parallel with the steering shaft 3. The main body of the motor 41 equipped with the output shaft 4 is mounted in the first housing 1. Steering shaft supporting sections 10 and 20 for supporting the steering shaft 3 and output shaft supporting sections 11 and 21 for supporting the output shaft 4 are provided in the first and second housings 1 and 2, respectively, and the steering shaft 3 and the output shaft 4 are supported using the steering shaft supporting sections 10 and 20 and the output shaft supporting sections 11 and 21 via bearings 7, 8, 9a and 9b, such as roller bearings.

The second housing 2 is mounted such that the mounting position of the second housing 2 with respect to the first housing 1 is set at a predetermined position using positioning means. In this embodiment, two pins 5a and 5b are engaged with two sets of pin holes 12a, 22a, 12b and 22b provided in the first housing 1 and the second housing 2, respectively, whereby the mounting position of the second housing 2 with respect to the first housing 1 is aligned at the predetermined position (see FIG. 2). In other words, the pin hole 12a, one of the pin holes provided in the first housing 1, is aligned with the pin hole 22a that is provided in the second housing 2 and corresponds to the pin hole 12a, and the pin 5a is engaged with one set of pin holes 12a and 22a, whereby positioning is done at one point. Furthermore, the other pin hole 12b provided in the first housing 1 is aligned with the pin hole 22b that is provided in the second housing 2 and corresponds to the pin hole 12b, and the pin 5b is engaged with one set of pin holes 12b and 22b, whereby the mounting position of the second housing 2 with respect to the first housing 1 is aligned at the predetermined position.

In the electric power steering apparatus configured as described above, the rotation of the steering wheel 33 turned by the driver is transmitted to the steering mechanism via the steering shaft 3, and the vehicle is steered. On the other hand, the rotation of the motor 41 is transmitted at reduced speed as the rotating motion of the steering shaft 3 via the small gear 40 and the large gear 30, and the steering operation by the driver is assisted by the transmitted drive power of the motor 41.

Next, a method for producing the electric power steering apparatus according to the present invention will be described.

Figure 3:
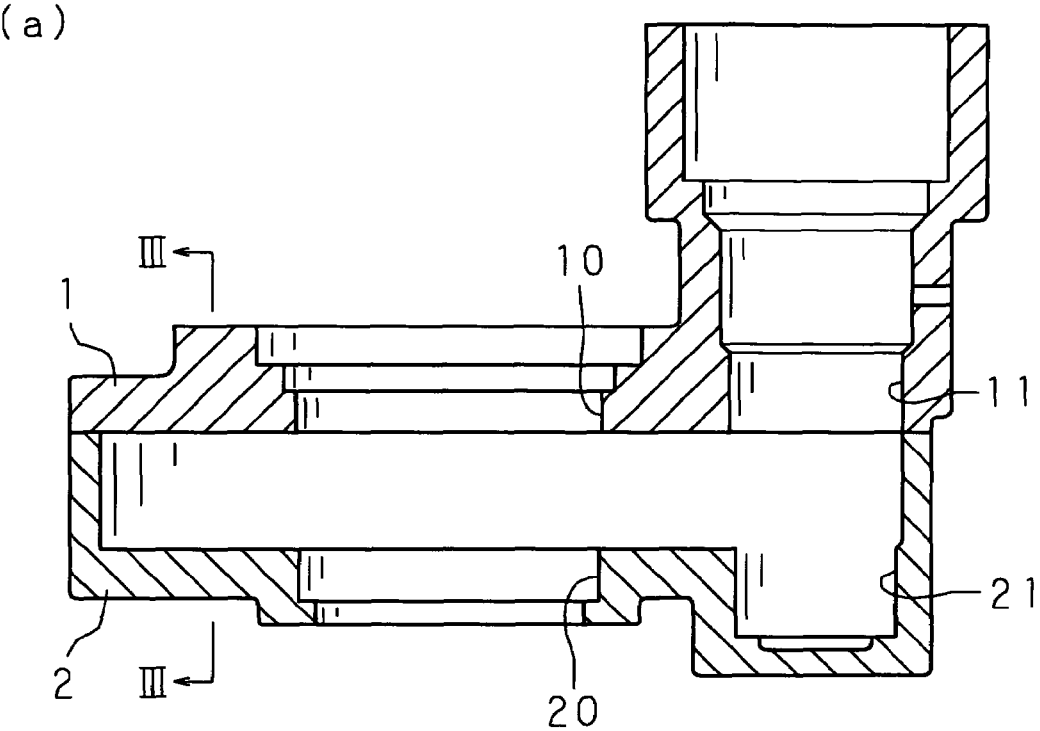
FIGS. 3(a) and 3(b) are sectional views of the main sections schematically showing processes for providing steering shaft supporting sections and output shaft supporting sections in first housing and the second housing respectively.
Figure 3:
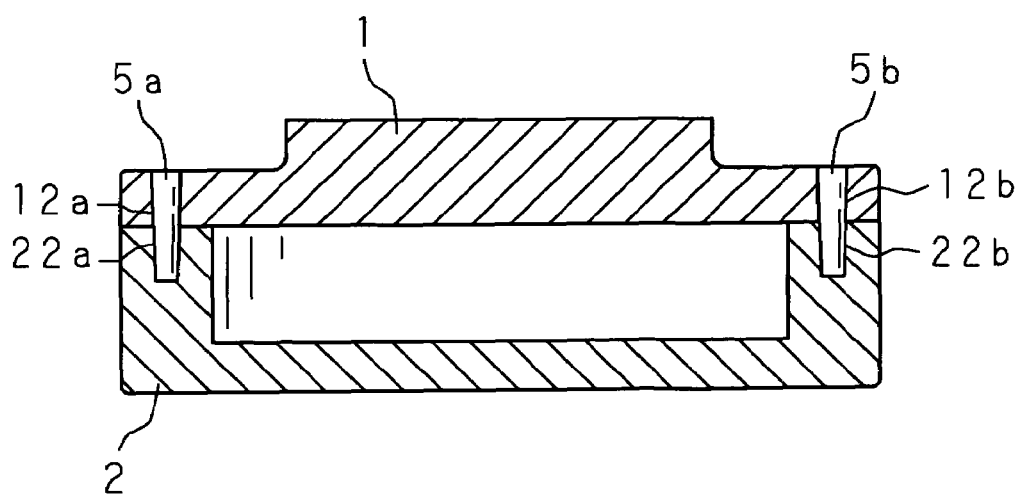

FIGS. 3(a) and 3(b) are sectional views of the main sections schematically showing processes for providing the steering shaft supporting sections 10 and 20 and the output shaft supporting sections 11 and 21 in the first housing 1 and the second housing 2 respectively. The lower view is a sectional view taken on line III-III of the upper view.

First, in the state that the mounting position of the second housing 2 with respect to the first housing 1 is aligned at the predetermined position using the positioning means, the second housing 2 is mounted on the first housing 1 using screws 6 or the like (see FIG. 2). Next, in the state that the second housing 2 is mounted on the first housing 1, the steering shaft supporting sections 10 and 20 having cylindrical shapes and the output shaft supporting sections 11 and 21 having cylindrical shapes are formed in the first and second housings 1 and 2, respectively, by process.

More specifically, the positioning of the mounting position of the second housing 2 with respect to the first housing 1 is carried out using the two pins 5a and 5b(positioning means or positioning unit) and the two sets of pin holes 12a, 22a, 12b, and 22b (positioning means or positioning unit). In other words, by the engagement of the two pins 5a and 5b, tapered pins or the like, with the two sets of pin holes 12a, 22a, 12b and 22b, tapered holes, respectively provided in the first housing 1 and the second housing 2, the mounting position of the second housing 2 with respect to the first housing 1 is aligned at the predetermined position that is determined using the pins 5a and 5b and the pin holes 12a, 22a, 12b and 22b. Next, for the purpose of providing the steering shaft supporting sections 10 and 20 and the output shaft supporting sections 11 and 21 in the first and second housings 1 and 2, the second housing 2 is mounted on the first housing 1 using the screws 6 or the like, in the state that the mounting position of the second housing 2 with respect to the first housing 1 is aligned at the predetermined position, the steering shaft supporting section 10 for supporting the steering shaft 3 on the first housing 1 via the bearing 7 and the steering shaft supporting section 20 for supporting the steering shaft 3 on the second housing 2 via the bearing 8 are formed in the first housing 1 and the second housing 2, respectively, in one process; furthermore, similarly, the output shaft supporting section 11 for supporting the output shaft 4 on the first housing 1 via the bearing 9a and the output shaft supporting section 21 for supporting the output shaft 4 on the second housing 2 via the bearing 9b are formed in the first housing 1 and the second housing 2, respectively, in one process.

The two sets of pin holes 12a, 22a, 12b and 22b are formed by aligning the second housing 2 with the first housing 1 at an appropriate position, by temporarily securing them using the screws 6 or the like, and by making holes in the first and second housings 1 and 2 being in the secured state using a drill or the like.

The steering shaft supporting section 10 of the first housing 1 is a cylindrical portion in which the bearing 7 for supporting the steering shaft 3 is mounted, and the steering shaft supporting section 20 of the second housing 2 is a cylindrical portion in which the bearing 8 for supporting the steering shaft 3 is mounted. The output shaft supporting section 11 of the first housing 1 is a cylindrical portion in which the bearing 9a for supporting the output shaft 4 is mounted, and the output shaft supporting section 21 of the second housing 2 is a cylindrical portion in which the bearing 9b for supporting the output shaft 4 is mounted.

Figure 4:
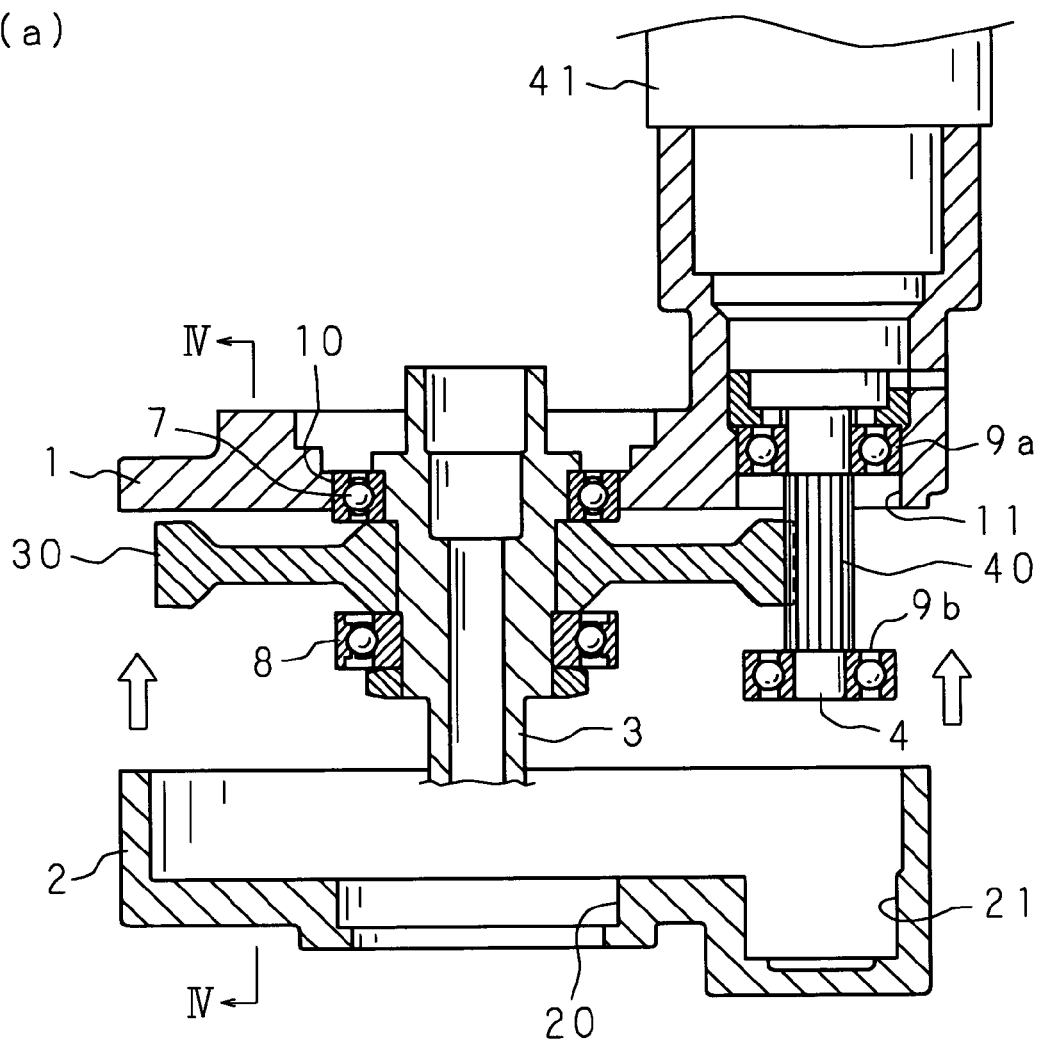
FIGS. 4(a) and 4(b) are sectional views of the main sections schematically showing processes for supporting a steering shaft and an output shaft using the steering shaft supporting sections and the output shaft supporting sections via bearings.
Figure 4:
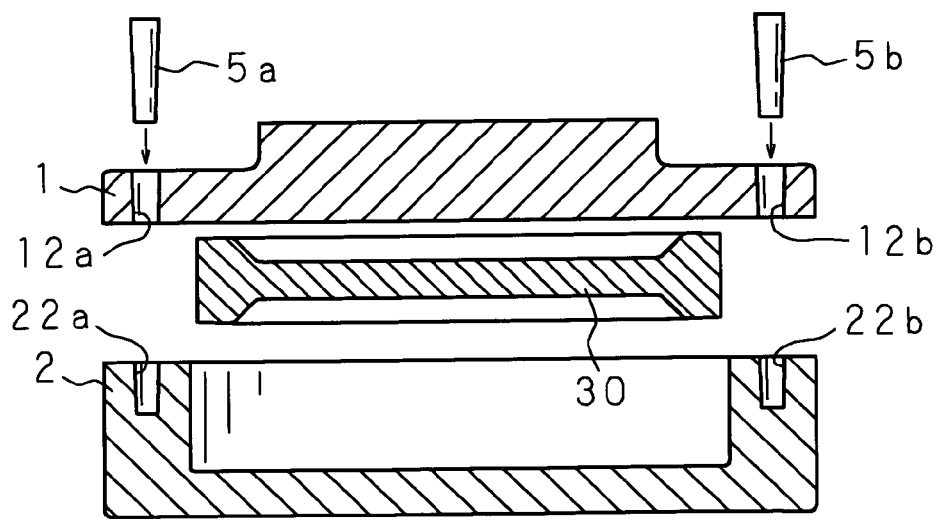

FIGS. 4(a) and 4(b) are sectional views of the main sections schematically showing processes for supporting the steering shaft 3 and the output shaft 4 using the steering shaft supporting sections 10 and 20 and the output shaft supporting sections 11 and 21 via the bearings 7, 8, 9a and 9b. The lower view is a sectional view taken on line IV-IV of the upper view.

First, for the purpose of accommodating the steering shaft 3 and the output shaft 4 in the first and second housings 1 and 2, the two pins 5a and 5b and the screws 6 are removed, and the second housing 2 is removed temporarily from the first housing 1. Next, the steering shaft 3 and the output shaft 4 are accommodated in the first housing 1 and the second housing 2 while being supported using the steering shaft supporting sections 10 and 20 and the output shaft supporting sections 11 and 21 via the bearings 7, 8, 9a and 9b.

More specifically, the two bearings 9a and 9b are pressure-fitted on the root and the end of the output shaft 4, and the main body of the motor 41 is mounted in the first housing 1. Similarly, the large gear 30 and the two bearings 7 and 8 disposed so as to hold the large gear 30 therebetween are pressure-fitted on the steering shaft 3, and the steering shaft 3 is accommodated in the first housing 1. After the accommodation, the second housing 2 is aligned with the first housing 1, whereby the steering shaft 3 is supported using the steering shaft supporting section 10 of the first housing 1 via the bearing 7 and also supported using the steering shaft supporting section 20 of the second housing 2 via the bearing 8. Similarly, the output shaft 4 is supported using the output shaft supporting section 11 of the first housing 1 via the bearing 9a and also supported using the output shaft supporting section 21 of the second housing 2 via the bearing 9b.

When the steering shaft 3 and the output shaft 4 are supported using the steering shaft supporting sections 10 and 20 and the output shaft supporting sections 11 and 21, it is preferable that the bearings 7, 8, 9a and 9b are pressurized in the axial direction so that the internal clearances in the bearings 7, 8, 9a and 9b are negative radial internal clearances. This can eliminate rattling between the steering shaft 3 and the bearings 7 and 8 and between the output shaft 4 and the bearings 9a and 9b.

Figure 5:
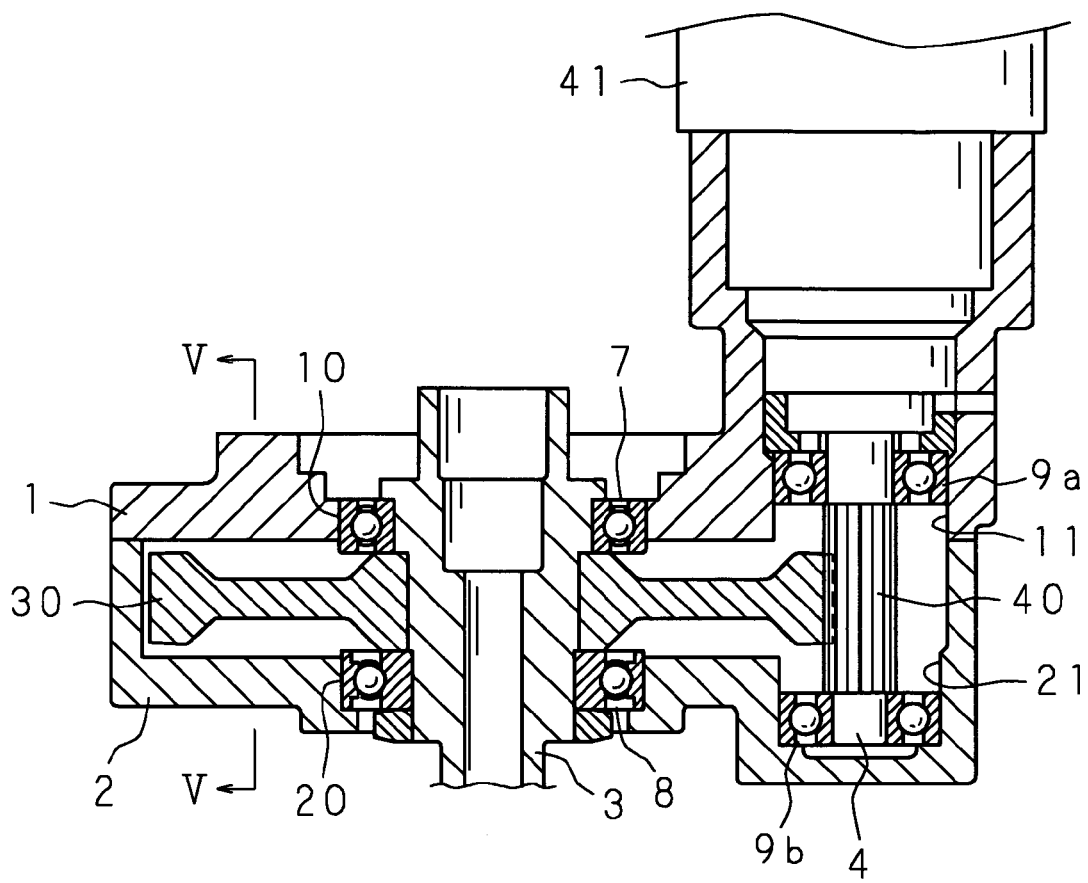
FIGS. 5(a) and 5(b) are sectional views of the main sections schematically showing processes for aligning the second housing with the first housing at a predetermined position using positioning means and for mounting the second housing.
Figure 5:
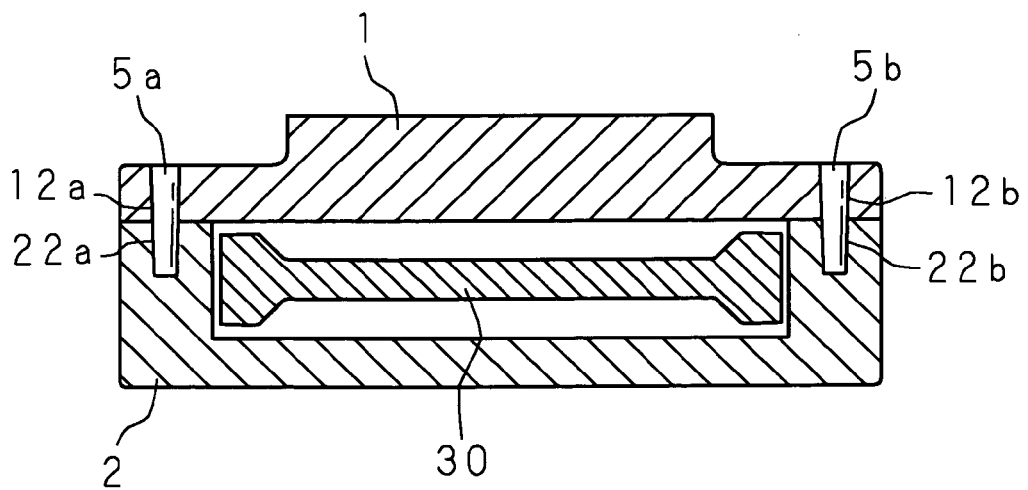

FIGS. 5(a) and 5(b) are sectional views of the main sections schematically showing processes for aligning the second housing 2 with the first housing 1 at the predetermined position using the positioning means and for mounting the second housing 2. The lower view is a sectional view taken on line V-V of the upper view.

The second housing 2 is aligned with the first housing 1, and the two pins 5a and 5b are engaged with the two sets of pin holes 12a, 22a, 12b and 22b provided in the first and second housings 1 and 2, whereby the mounting position of the second housing 2 with respect to the first housing 1 is determined at the predetermined position. The predetermined position is the same as the predetermined position at which the second housing 2 is mounted on the first housing 1 when the steering shaft supporting sections 10 and 20 and the output shaft supporting sections 11 and 21 are provided. In this state, the second housing 2 is mounted on the first housing 1 using the screws 6 (see FIG. 2). Furthermore, the main body of the motor 41 is also accommodated in the first housing 1 using screws (not shown) or the like.

In the electric power steering apparatus being produced using this method, the second housing 2 is aligned with the first housing 1 at the predetermined position and mounted thereon; in the mounting state, the steering shaft supporting sections 10 and 20 and the output shaft supporting sections 11 and 21 are processed; the second housing 2 is temporarily removed from the first housing 1; after the steering shaft 3 and the output shaft 4 are accommodated in the first and second housings 1 and 2, the second housing 2 is aligned again with the first housing 1 at the predetermined position and mounted thereon; hence, the center distance between the steering shaft 3 and the output shaft 4, that is, the center distance between the large gear 30 and the small gear 40, is constant in the range of the dimensional errors of the supporting sections 10, 20, 11 and 21 and the bearings 7, 8, 9a and 9b. For this reason, the gear strength and appropriate backlash assumed in the design of the gears can be obtained securely.

In addition, in this embodiment, because the steering shaft 3 and the output shaft 4 are supported using the steering shaft supporting sections 10 and 20 and the output shaft supporting sections 11 and 21 via the bearings 7, 8, 9a and 9b, even if the electric power steering apparatus is used for a long time, the above-mentioned gear strength and backlash can be obtained securely.

Furthermore, in this embodiment, because the mounting position of the first housing 1 with respect to the second housing 2 is determined by engaging the two pins 5a and 5b with the two sets of pin holes 12a, 22a, 12b and 22b provided in the first and second housings 1 and 2, respectively, the positioning can be carried out easily with high position accuracy. In other words, the mounting position of the second housing 2 with respect to the first housing 1 can be aligned at the predetermined position in the range of the dimensional errors of the two sets of pin holes 12a, 22a, 12b and 22b and the two pins 5a and 5b. Hence, the center distance between the small gear 40 and the large gear 30 can be made constant with high position accuracy.

Moreover, in this embodiment, because tapered holes are used as the two sets of pin holes 12a, 22a, 12b and 22b, and because tapered pins are used as the two pins 5a and 5b, the second housing 2 can be positioned on the first housing 1 at the predetermined position, regardless of the dimensional errors of the two sets of pin holes 12a, 22a, 12b and 22b and the two pins 5a and 5b.

In this embodiment, although tapered holes and tapered pins are used as the two sets of pin holes and the two pins, it is needless to say that the two sets of pin holes and the two pins are not limited to these, but parallel holes and parallel pins and the like may also be used. In this case, it is preferable that transition fit should be used for the fitting between the parallel holes and the parallel pins. By the use of the transition fit, the positioning can be carried out with high position accuracy in comparison with clearance fit.

Still further, in this embodiment, bearings with ordinary cylindrical bores are used; however, without being limited to these, bearings with tapered bores may also be used. In the case that the bearings with tapered bores are used, the steering shaft and the output shaft can be supported using the steering shaft supporting sections and the output shaft supporting sections at more accurate positions.

Embodiment 2

In an electric power steering apparatus, helical gears will be described, in which one set of gears is used, and the large gear thereof is made as small as possible while the speed reduction ratio required for assisting steering operation is maintained and while the gear strength applicable to practical use can be obtained securely. Except for the large gear and the small gear, the configuration and the production method are similar to those of Embodiment 1.

The electric power steering apparatus comprises a large gear mounted on the steering shaft 3 and a small gear 40 mounted on the output shaft 4 of the motor 41, and the large gear and the small gear 40 are spur gears or helical gears configured as involute gears. By the use of the spur gears or the helical gears, the motor 41 can be disposed so as to be in nearly parallel with the steering shaft 3. However, the outside dimensions of the motor 41 are physically restricted in layout depending on the center distance L between the steering shaft 3 and the output shaft 4 of the motor 41. For example, because of the restrictions in layout, the maximum allowable outside dimensions of the motor 41 are 80 mm in diameter and 95 mm in height. In this case, for the purpose of securely obtaining a rotary torque of 35 Nm or more as the steering assist torque around the steering shaft, the rated torque is set at 4 Nm, the center distance L is set at 55 mm, and the speed reduction ratio N is set at approximately 10.

Figure 6:
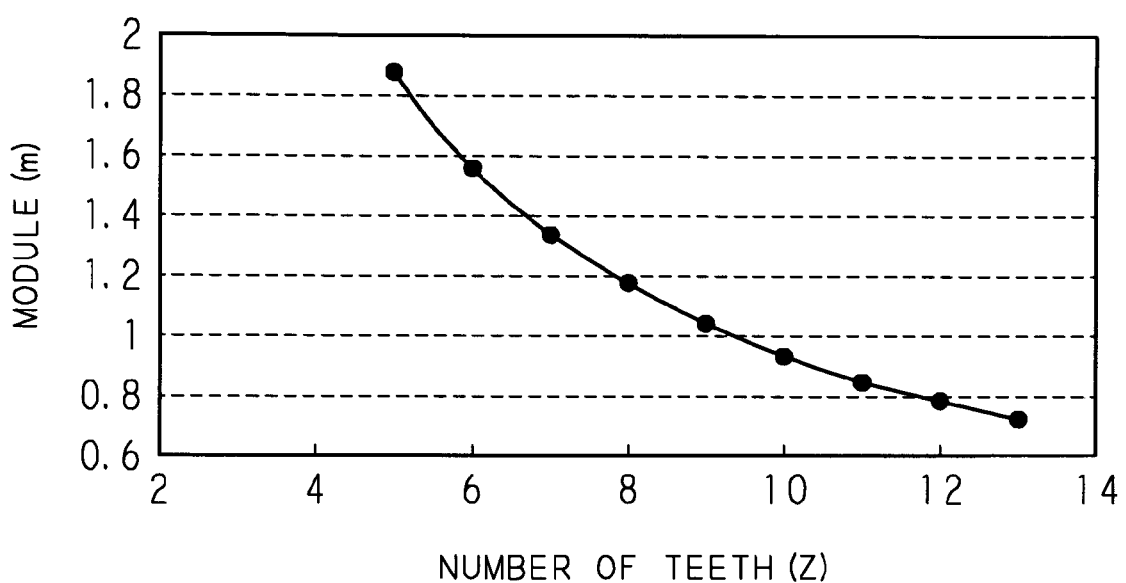
FIG. 6 is a graph showing the relationship between the number of teeth of a small gear and the module of the small gear.

FIG. 6 is a graph showing the relationship between the number of teeth Z of the small gear 40 and the module m of the small gear 40 in the case that the center distance L between the steering shaft 3 and the output shaft 4 of the motor 41 is 55 mm, that the speed reduction ratio N is 10, and that the helix angle â is 25 degrees. Although the pitch circle diameter d (=Z×m) of the small gear 40 is approximately 8 to 10 mm, for the purpose of avoiding states in which the number of teeth is too many or too few, the practically endurable ranges of the number of teeth Z and the module m are 6 or more and 15 or less and 0.8 or more and 1.5 or less, respectively.

Next, in consideration of gear production errors and the elastic deformation amounts of the gear teeth in the case that rated load operation is carried out, the pressure angle á is determined so that the trochoid interference clearance and the tooth thickness at the addendum have appropriate values. FIG. 7 is a graph showing the relationship among the pressure angle á, the trochoid interference clearance and the tooth thickness at the addendum of the small gear 40 in the case that the center distance L is 54.7 mm, that the number of teeth Z is 10, that the module m is 0.95 and that the tooth depth h is 2.25 times the module m. The circular marks in FIG. 7 indicate trochoid interference clearance values, and the square marks indicate values each obtained by dividing the tooth thickness at the addendum by the module value.

For the purpose of avoiding occurrence of trochoid interference, the trochoid interference clearance is required to be 0.2 mm or more. As shown in FIG. 7, in the case that the pressure angle á is in the range of 20 degrees or more and 35 degrees or less as specified as standard values in JIS (Japanese Industrial Standard), the trochoid interference clearance is 0.2 mm or more when the pressure angle á is 23 degrees or more, and trochoid interference does not occur. On the other hand, for the purpose of securely obtaining the strength at the addendum, the tooth thickness at the addendum is required to be 0.3 times the module m or more. For the purpose of obtaining the tooth thickness at the addendum being 0.3 times the module m or more, the pressure angle á is required to be 27 degrees or less as shown in FIG. 7. The practical range of the helix angle â is 0 degrees or more and 40 degrees or less.

In the case that steel is used as the material of the small gear 40 and the large gear, the tooth face stress ó$_s$ for the load P$_n$ applied perpendicularly to a tooth of the small gear 40, generated by the assist rotary torque, can be obtained approximately using (Equation 1).

$$\sigma_S^2 = 0.35 \cdot E \cdot P_n \left[ \frac{Z_1 + Z_2}{Z_2} \right] \frac{\cos^2 \beta_g}{\varepsilon_s \cdot b \cdot d_b \cdot \sin \alpha_b} \quad \text{[Equation 1]}$$

In (Equation 1), E designates the longitudinal elastic modulus of the material of the gear (steel in this embodiment), å$_s$ designates the transverse contact ratio of the gear, b designates the tooth width of the small gear 40, d$_b$ designates the meshing pitch circle diameter of the small gear 40, á$_b$ designates the meshing pressure angle of the small gear 40, â$_g$ designates the cylindrical helix angle of the base circle of the small gear 40, Z$_1$ designates the number of teeth of the small gear 40, and Z$_2$ designates the number of teeth of the large gear.

FIG. 8 is a graph showing the relationship of the tooth face stress ó$_s$ and the tooth thickness at addendum depending on the tooth depth h of the small gear 40 in the case that E is 206000 N/mm², $P_n$ is 946 N, b is 14 mm, $Z_1$ is 10, $Z_2$ is 97, m is 0.95, the pressure angle á is 25 degrees, the helix angle â is 25 degrees, $d_b$ is 10.225 mm, $á_b$ is 25.063 degrees, and $â_g$ is 21.631 degrees in (Equation 1). The circular marks in FIG. 8 indicate tooth face stress values, and the square marks indicate values each obtained by dividing the tooth thickness at the addendum by the module value.

In the case that the target value of the tooth face stress $ó_s$ is the threshold value of 1760 N/mm² or less in the design of the power transmission gear of an automobile and that the target value of the tooth thickness at the addendum is 0.3 times the module m or more, both the conditions can be satisfied simultaneously in the case that the tooth depth h is 2.4 times the module m or less, as shown clearly in FIG. 8.

Figure 9:
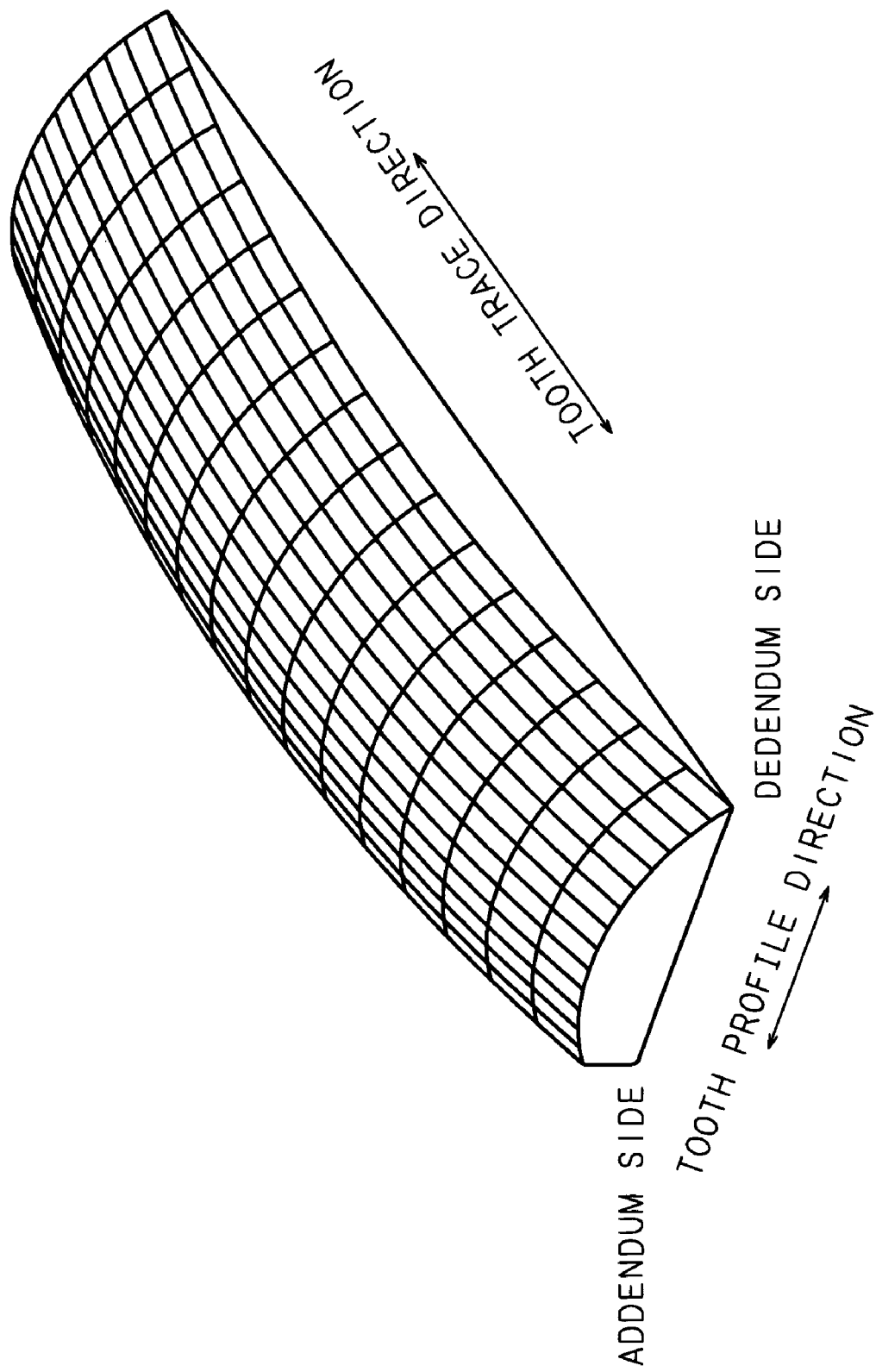
FIG. 9 is an explanatory view showing the tooth face profile of a gear being used for the electric power steering apparatus according to the embodiments of the present invention.

FIG. 9 is an explanatory view showing the tooth face profile of a gear being used for the electric power steering apparatus according to the embodiments of the present invention. For the purpose of compensating for the lowering of the strength at the deddendum, the tooth face profile of either one of the large gear and the small gear or both of the gears used as a pair is formed as shown in FIG. 9. In FIG. 9, the tooth face of the gear is divided in a mesh pattern in the lengthwise and crosswise directions. In the tooth profile direction, a negative pressure angle error is provided so that the pressure angle at the deddendum is larger than the pressure angle at the addendum, and the tooth face profile is formed in a direction such that the mutual meshing stress increases, that is, such that the central portion thereof has a convex shape. In addition, crowning is carried out in the tooth trace direction and the central portion thereof also is formed to have a convex shape in the tooth trace direction.

With the tooth face profile described above, the distribution of the contact stress on the tooth face of the gear can be made even in the tooth profile direction and the tooth trace direction, thereby capable of preventing partial abrasion on the tooth face, compensating for the insufficient strength at the deddendum, and contributing to improvement in durability.

Furthermore, because the small gear or the large gear having the tooth face profile described above are mounted using the production method described in Embodiment 1, the center distance between the large gear and the small gear can be maintained constant accurately, and the gear strength assumed in the design of the gear can be obtained securely.

The invention claimed is:

1. A method for producing an electric power steering apparatus assisting steering by transmitting the drive power of a motor via a small gear provided on the output shaft of said motor and a large gear meshed with said small gear to a steering shaft provided with said large gear, and comprising first and second housings accommodating said steering shaft and said output shaft, said second housing being mounted on said first housing; comprising the steps of:
    temporarily mounting said second housing on said first housing in the state that the mounting position of said second housing with respect to said first housing is aligned at a predetermined position using a positioning unit that aligns said second housing at said predetermined position;
    providing steering shaft supporting sections that support said steering shaft and output shaft supporting sections that support said output shaft in nearly parallel with said steering shaft for said first housing and said second housing respectively;
    removing said second housing from said first housing;
    supporting said steering shaft and said output shaft using said steering shaft supporting sections and said output shaft supporting sections via bearings; and
    mounting said second housing on said first housing by aligning said second housing at said predetermined position using said positioning unit.

2. The method for producing said electric power steering apparatus according to claim 1, wherein said positioning unit comprises two sets of pin holes provided in said first housing and said second housing respectively and two pins to be engaged with said pin holes.

3. The method for producing said electric power steering apparatus according to claim 2, wherein said pin holes are tapered holes, and said pins are tapered pins.

4. The method for producing said electric power steering apparatus according to claim 1, wherein
    the center distance between said output shaft and said steering shaft is 35 mm or more and 85 mm or less,
    in said small gear, the number of teeth is 6 or more and 15 or less, the module is 0.8 or more and 1.5 or less, the tooth depth is 2.4 times the module or less, the pressure angle is 20 degrees or more and 27 degrees or less, and the helix angle is 20 degrees or more and 40 degrees or less, and
    the tooth profile of one or both of said small gear and said large gear is formed so that the pressure angle increases in the direction from the addendum to the deddendum of the gear, and an involute gear subjected to crowning in the tooth trace direction is used for one or both of said small gear and said large gear.

5. A method for producing an electric power steering apparatus assisting steering by transmitting the drive power of a motor via a small gear provided on the output shaft of said motor and a large gear meshed with said small gear to a steering shaft provided with said large gear, and comprising first and second housings accommodating said steering shaft and said output shaft, said second housing being mounted on said first housing; comprising the steps of:
    temporarily mounting said second housing on said first housing in the state that the mounting position of said second housing with respect to said first housing is aligned at a predetermined position using positioning means that aligns said second housing at said predetermined position;
    providing steering shaft supporting sections that support said steering shaft and output shaft supporting sections that support said output shaft in nearly parallel with said steering shaft for said first housing and said second housing respectively;
    removing said second housing from said first housing;
    supporting said steering shaft and said output shaft using said steering shaft supporting sections and said output shaft supporting sections via bearings; and
    mounting said second housing on said first housing by aligning said second housing at said predetermined position using said positioning means.

6. The method for producing said electric power steering apparatus according to claim 5, wherein said positioning means comprises two sets of pin holes provided in said first housing and said second housing respectively and two pins to be engaged with said pin holes.

7. The method for producing said electric power steering apparatus according to claim 6, wherein said pin holes are tapered holes, and said pins are tapered pins.

8. The method for producing said electric power steering apparatus according to claim 5, wherein the center distance between said output shaft and said steering shaft is 35 mm or more and 85 mm or less, in said small gear, the number of teeth is 6 or more and 15 or less, the module is 0.8 or more and 1.5 or less, the tooth depth is 2.4 times the module or less, the pressure angle is 20 degrees or more and 27 degrees or less, and the helix angle is 20 degrees or more and 40 degrees or less, and the tooth profile of one or both of said small gear and said large gear is formed so that the pressure angle increases in the direction from the addendum to the deddendum of the gear, and an involute gear subjected to crowning in the tooth trace direction is used for one or both of said small gear and said large gear.

* * * * *